US006942912B1

(12) United States Patent
Blom et al.

(10) Patent No.: US 6,942,912 B1

(45) Date of Patent: Sep. 13, 2005

(54) TRANSFER LABEL

(75) Inventors: Patrick Johannes Blom, Leiden (NL); Thomas Lynn Brandt, Windsor, NY (US)

(73) Assignee: Heineken Technical Services B.V., Amsterdam (NL)

( * ) Notice: Subject to any disclaimer, the term of this patent is extended or adjusted under 35 U.S.C. 154(b) by 0 days.

(21) Appl. No.: 10/069,263

(22) PCT Filed: Aug. 24, 2000

(86) PCT No.: PCT/NL00/00584

§ 371 (c)(1),
(2), (4) Date: Jun. 19, 2002

(87) PCT Pub. No.: WO01/15915

PCT Pub. Date: Mar. 8, 2001

(30) Foreign Application Priority Data

Aug. 27, 1999 (EP) .................................. 99202789

(51) Int. Cl.[7] .................................................. B32B 9/00

(52) U.S. Cl. .................... 428/44.1; 428/40.1; 428/202; 428/203; 428/195.1; 428/204; 428/206; 428/207; 428/208; 428/343; 428/354; 503/207

(58) Field of Search ................................ 428/202, 203, 428/204, 206, 207, 914, 208, 343, 354, 40.1, 428/41.1, 195.1; 503/207; 430/256

(56) References Cited

U.S. PATENT DOCUMENTS 5,484,758 A * 1/1996 Wald .......................... 503/214
5,851,614 A * 12/1998 Buck .......................... 428/40.1
5,894,552 A * 4/1999 Bouthillier et al. .......... 713/201
6,509,075 B1 1/2003 McCurry et al.

FOREIGN PATENT DOCUMENTS

| | | |
|---|---|---|
| JP | 11-115391 | 4/1999 |
| WO | 90/05088 | 5/1990 |
| WO | 90/05353 | 5/1990 |
| WO | 97/34810 | 9/1997 |
| WO | 97/35290 | 9/1997 |
| WO | 97/35291 | 9/1997 |
| WO | 97/35292 | 9/1997 |

OTHER PUBLICATIONS

Patent Abstracts of Japan vol. 011, No. 001 (M-550), Jan. 6, 1987 & JP 61 179779 A (Tsuneto Watanabe), Aug. 12, 1986 abstract.

Patent Abstracts of Japan vol. 018, No. 119 (M-1567), Feb. 25, 1994 & JP 05 309996 A (Nippon Paint Co Ltd), Nov. 22, 1993 abstract.

Patent Abstracts of Japan vol. 1999, No. 09, Jul. 30, 1999 & JP 11 115391 A (Showa Ink Kogyosho KK;Kametani Sangyo KK), Apr. 27, 1999 abstract.

(Continued)

*Primary Examiner*—Rena Dye
*Assistant Examiner*—Tamra L. Dicus
(74) *Attorney, Agent, or Firm*—Pearne & Gordon LLP

(57) ABSTRACT

The invention is directed to a transfer label material for image transfer, comprising a backing carrier material and a transfer layer, said transfer layer at least comprising an image layer, an adhesive layer and a pigmented layer between the adhesive layer and the image layer, said pigmented layer comprising a binder material, at least one white pigment and at least 0.1 wt. %, calculated on the basis of the pigmented layer, of aluminum powder (dry weight).

19 Claims, 1 Drawing Sheet

LABEL & SUBSTRATE
EXPLODED VIEW

OTHER PUBLICATIONS

Patent Abstracts of Japan vol. 014, No. 375 (M-1010), Aug. 14, 1990 & JP 02 137986 A (Honda Motor Co Ltd), May 28, 1990 abstract.

Patent Abstracts of Japan vol. 012, No. 195 (M-705), Jun. 7, 1988 & JP 63 0015895 A (Reiko Co Ltd), Jan. 6, 1988 abstract.

Database WPI Section Ch, Week 199424 Derwent Publications Ltd., London, GB; AN 1994-196794 XP002131911 & JP 06 135198 A (Nippon Shashin Insatsu KK), May 17, 1994 abstract.

* cited by examiner

TRANSFER LABEL

FIELD OF THE INVENTION

This application was published in English on Mar. 8, 2001 as International Publication Number WO 01/15915 A1.

The invention is directed to a transfer label, based on an image transfer system and more in particular on a transfer label that is opaque, and can be applied over pre-existing permanent printed images on substrate surfaces.

BACKGROUND OF THE INVENTION

Quite often there is a need for application of a label on a surface that already has a pre-existing permanent printing on it, for example a silk screen printing, which cannot be removed without destructive treatment of the surface. This need may arise in the case of a container, such as a plastic crate for (beer) bottles or other goods, that is used for different brands or promotional items.

It has already been proposed and applied in practice to glue an opaque paper or plastic label on top of the pre-existing printed images.

Recently, much attention has been directed to the application of labels by image transfer to a surface. Image transfer is defined as the process of transferring a reverse printed ink-only image from a backing material (carrier web) onto a receiving surface, such as that of a bottle or a crate.

There is a need for using this system of image transfer in relation to applying labels over pre-existing permanent printed images. However, this has the problem that the conventional ink-only labels (image transfer) generally do not provide sufficient opacity to fully cover and mask the pre-existing print and the color of the article on which the label is to be applied. Inclusion of a conventional white layer in the transfer label based on titanium dioxide, zinc oxide and/or calciumcarbonate pigments can create problems with the printing of the label onto the backing layer and with the transferability of the label material to the substrate surface. Generally more than two layers of white pigmented ink have to be used, to provide sufficient opacity to mask the pre-existing print and/or the color of the substrate article.

There is a need for preventing possible bleed through from affecting the new label image. Bleed through of the background color could affect tone, hue and/or brightness of the image. There is a need to prevent this.

There is accordingly a need for an improved label material wherein at least one opaque layer is present, which serves, among others to hide an existing imprint, while at the same time providing at least equivalent processing characteristics in terms of label printing and transfer.

The invention is directed to a transfer label material for image transfer, comprising a backing material and a transfer layer, said transfer layer at least comprising an image layer, an adhesive layer and a pigmented layer between the adhesive layer and the image layer, said pigmented layer comprising a binder material, a pigment and at least 0.1 wt. %, calculated on the basis of the dry weight of the pigmented layer, of aluminium powder.

It has been found that adding a relatively small amount of aluminium powder to at least one pigmented layer results in an opacity, sufficient to hide an existing underlying printing and/or to prevent bleed through of the background color. The amount of aluminium powder can be kept quite low, up to 5 wt. %, preferably between 0.1 and 1.5 wt. %.

The aluminium powder may be used as such, or incorporated in a suitable matrix material such as a fat derivative, incluidng but not limited to fats and oils, fatty acids, fatty acid esters and the like.

In view of the printing properties of the pigmented layer it is preferred to use aluminium powder with a particle size of between 1 and 100 μm, preferably between 5 μm and 50 μm.

DETAILED DESCRIPTION OF THE INVENTION

Figure 1:
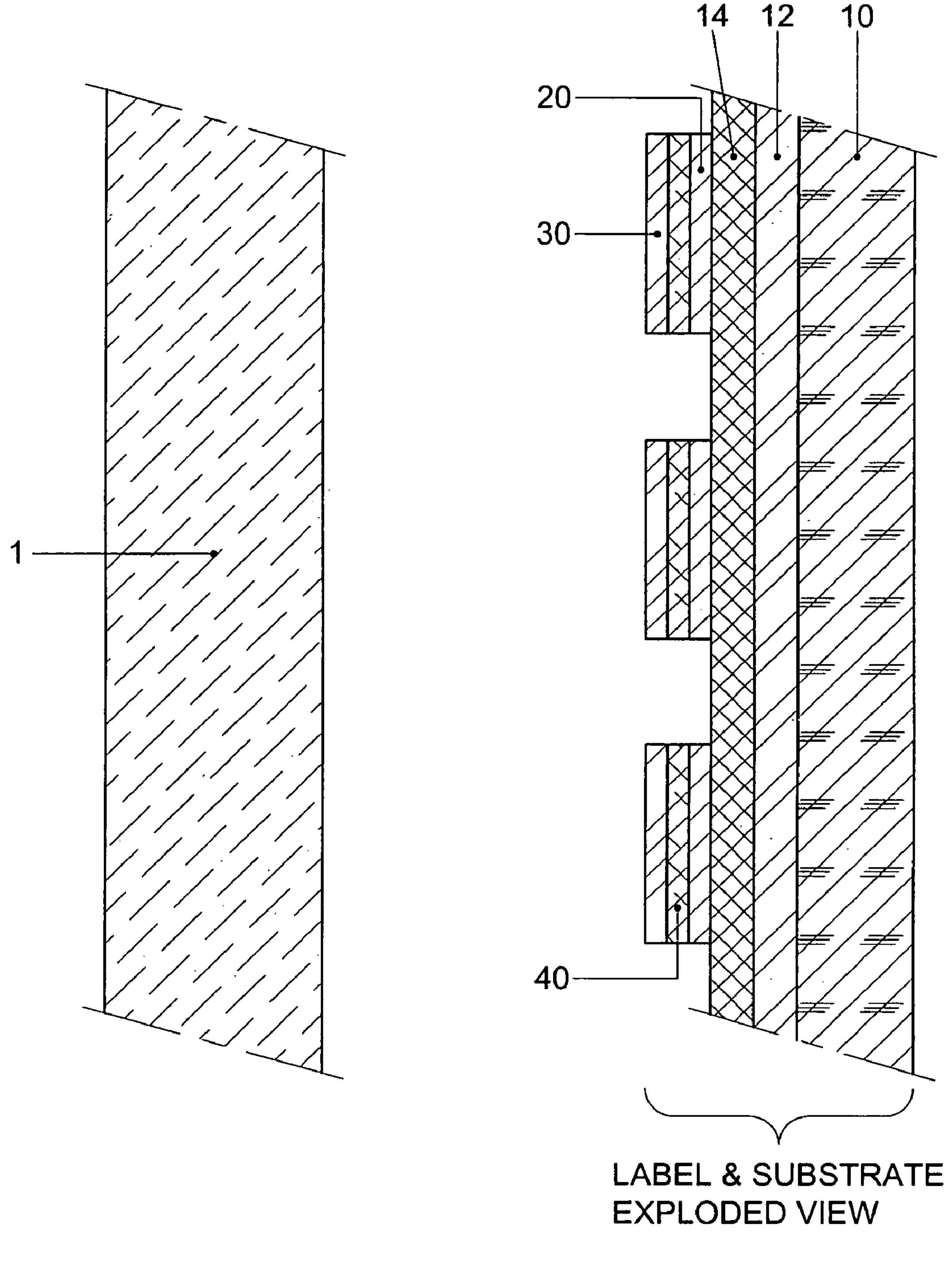
FIG. 1 shows a substrate surface (1) and a label positioned for application.

The label materials of the invention can comprise various layers, the essential ones being the removable backing layer, at least one image layer, an opaque layer and an adhesive layer. Depending on the use of the label, the actual build-up of the label may vary. In the most simplistic embodiment the label only consists of the layers described herein. Generally however, more layers are present. In one embodiment the image layer can consist of two or more separate layers, each comprising different colours. Further it is possible to use more than one adhesive layer and/or a bonding layer between the adhesive layer and said opaque pigmented layer. Also a protective layer may be present on top of the image layer, between the image layer and the removable backing layer.

Depending on the structure of the label, it can be utilized for either removable or permanent applications. In particular for use on plastic crates which hold bottles, it may be advantageous to use removable labels, more in particular to provide temporary labels for promotional activities, or to indicate the brand of the contents, which can vary depending on changing marketing demands.

The various possibilities of label structure can be found in the documents cited here after, the said structures being incorporated herein by way of reference.

In the context of the present invention the term image transfer is used to define a labelling system, wherein a removable backing layer is reverse printed with a suitable ink and subsequently overprinted with adhesive. Important in the image transfer technique is the absence of a transparent or opaque supporting carrier film on the image, once it has been transferred to the surface. At this stage, the image (label) only consists of adhesive, ink materials, optionally with a clear protective coating. A general disclosure of this technique is for example disclosed in WO-A 9005088 and WO-A 9005353. Other embodiments of the image transfer system are disclosed in WO-A 9734810, WO-A 0735292, WO-A 9735291 and WO-A 9735290, the contents of all six applications is incorporated herein by way of reference.

In the context of the present invention it is also possible to use other types of no-label-look materials, such as transparent or semi-transparent labels having a supporting film layer that is incorporated in the label.

The preferred embodiment of the label and application according to the present invention will be described first with references to the figure which shows a substrate surface (1) and the label positioned for application. The label is printed on a carrier film (10) which may be any thin film, preferably oriented polypropylene or polyester. (14) is a protective coating which may or may not be employed, depending on the properties and use of the final label. (12)

is a release material which coats the carrier film for the purpose of providing a known, low peel force mechanical separation. It may be silicone which is generally applied to the film after the film manufacture. (20) represents all the printed ink material, which may be permanent or removable, depending on the desired characteristics.

Depending on the label graphics and opacity requirements the ink materials may be as many as eight (8) different colors in one or more layers, some of which may overlay another. (30) represents a layer of adhesive. (40) represents the pigmented opaque layer. It is to be noted that adhesive and opaque layer may be construed from more than one layer.

Upon application, all of the printed materials are transferred from the release coated film substrate. The printed ink materials can be vinyl, acrylic, urethane or polyester resin based, or combinations thereof, colored with pigments or dyes. The printed adhesive can be a urethane modified acrylic, heat activatable adhesive or any other suitable heat activatable adhesive. For heat activatable adhesive to achieve and maintain tack quickly it may be necessary to heat the substrate surface before the label adhesive is put in contact with it. In some applications it is also possible to use a pressure sensitive adhesive.

Many options are available for heating the substrate surface. Convective hot air, oxidizing flame heaters, gas fired infra-red panels and electric ceramic panels can all be used.

The method of label application whereby the printed ink materials are transferred from the carrier film to the substrate surface, utilising the tactile characteristics of the adhesive to overcome the bond of the ink layer 14 to the release coating 12.

Many types of silicone coated polymer films can be used for the printed carrier film.

The invention is applicable to various systems of label handling, including, but not limited to reel-to reel systems and magazine fed systems.

In a reel-to-reel system, conventional web handling techniques can be used to advance the film to present the next label and position it accurately, utilizing a printed "I" mark to trigger an optical scanning device.

Protection of the image against scratching by casual handling as well as insuring its weatherability when subjected to outdoor storage may be achieved with the application of a protective coating, such as a water based acrylic wax emulsion. This can be applied via a roller coater device, which is supplied with coating material through a doctor blade in order to control the amount of coating applied. The coating extends well past the edges of the label image and seals the edges from intrusive moisture. It is also possible to have a protective coating present preprinted on the transfer label.

The essential aspect of the invention resides in the use of a pigmented layer between the image layer and the adhesive layer. The said pigmented layer, preferably opaque, at least consists of an ink resin as a binder, white pigment, the white pigment usually being titanium dioxide, zinc oxide and/or calcium carbonate, and aluminium powder. Said aluminium powder is present in an amount of at least 0.1 wt. %, more in particular in an amount of between 0.2 and 5 wt. %, calculated on the weight of the pigmented layer.

The ink resin binder for the pigmented layer can be any ink suitable for application in image transfer systems, such as solvent based or water based acrylic, urethane and the like inks, preferably a water based acrylic ink.

The invention is now elucidated on the basis of the following examples, which are not intended as limiting the scope of the invention in any way.

EXAMPLES

Two transfer labels were prepared by rotogravure printing with the following sequence of layers printed onto a siliconised film of OPP:

1. Protective layer, comprising a transparent acrylic ink
2. One or more (up to eight) ink image layers, comprising of suitable pigmented inks or dyes
3. First layer containing white pigment in an acrylic binder
4. Two different second layers containing two different white pigment compositions (one comparative; one according to the invention) in an acrylic binder
5. Binding layer, providing adhesion between white layers and adhesive
6. Heat activatable adhesive layer The two label variants were then transferred onto the surface of a plastic bottle crate, over an existing silk screen printing.

In the first example the two white layers contained 4 $g/m^2$ of white pigment, $TiO_2$. Even with this large amount of pigment the pre-existing silk screen printing could be visually noticed through the label image. Increase of the amount of pigment was not possible in light of the deterioration of printing and transfer characteristics.

In a second example 0.6 wt. % of aluminium powder, having a particle size of 15 $\mu$m, based on the weight of the said layer, was added. The label was completely opaque and the existing printing could not be visually noticed through the label image. The printing and application characteristics were good.

What is claimed is:

1. Transfer label material for image transfer, comprising a backing carrier material and a transfer layer, said transfer layer at least comprising an image layer, an adhesive layer and an opaque pigmented layer between the adhesive layer and the image layer, said pigmented layer comprising a binder material and at least two different pigments, one of said two pigments being aluminum powder, said aluminum powder being present in a concentration of not less than 0.1 weight percent and not more than 5 weight percent, calculated on the basis of the pigmented layer, said aluminum powder being present in a weight percent which is sufficient to provide enough additional opacity to effectively mask printing on an underlying substrate.

2. Transfer label material according to claim 1, wherein the transfer layer further comprises a boundary layer between the backing carrier material and the image layer.

3. Transfer label material according to claim 1, wherein the aluminum powder has a particle size between 1 and 100 $\mu$m.

4. Transfer label material according to claim 1, wherein the pigmented layer contains a water based ink as binder material.

5. Shaped object, having at least one surface, being provided with at least one label transferred from a transfer label material comprising a backing carrier material and a transfer layer, said transfer layer at least comprising an image layer, an adhesive layer and an opaque pigmented layer between the adhesive layer and the image layer, said pigmented layer comprising a binder material and at least two different pigments, one of said two pigments being aluminum powder, said aluminum powder being present in a concentration of not less than 0.1 weight percent and not more than 5 weight percent, calculated on the basis of the pigmented layer, said aluminum powder being present in a weight percent which is sufficient to provide enough additional opacity to effectively mask printing on an underlying substrate.

6. Transfer label material according to claim 3, wherein the transfer layer further comprises a boundary layer between the backing carrier material and the image layer.

7. Transfer label material according to claim 1, wherein the aluminum powder has a particle size between 5 and 50 μm.

8. Transfer label material according to claim 2, wherein the aluminum powder has a particle size between 1 and 100 μm.

9. Transfer label material according to claim 7, wherein the pigmented layer contains a water based ink as binder material.

10. Transfer label material according to claim 2, wherein the pigmented layer contains a water based ink as binder material.

11. Transfer label material according to claim 3, wherein the pigmented layer contains a water based ink as binder material.

12. The shaped object of claim 5, wherein the transfer layer further comprises a boundary layer between the backing carrier material and the image layer.

13. The shaped object of claim 5, wherein the aluminum powder has a particle size between 1 and 100 μm.

14. The shaped object of claim 5, wherein the pigmented layer contains a water based ink as binder material.

15. A transfer label according to claim 1, in which the pigmented layer comprises up to 1.5 wt. % aluminum powder.

16. Transfer label material according to claim 1 wherein one of said two pigments is titanium dioxide.

17. Transfer label material according to claim 1, wherein one of said two pigments is zinc oxide.

18. Transfer label material according to claim 1, wherein one of said two pigments is calcium carbonate.

19. Transfer label material according to claim 1, wherein one of said two pigments is selected from the group consisting of titanium dioxide, zinc oxide and calcium carbonate.

* * * * *

UNITED STATES PATENT AND TRADEMARK OFFICE
CERTIFICATE OF CORRECTION

PATENT NO. : 6,942,912 B1 
DATED : September 13, 2005
INVENTOR(S) : Patrick Johannes Blom and Thomas Lynn Brandt It is certified that error appears in the above-identified patent and that said Letters Patent is hereby corrected as shown below:

<u>Title page,</u>
Item [56], References Cited, U.S. PATENT DOCUMENTS, delete
"5,894,552 A * 4/1999 Bouthillier et al. 713/201" and insert
-- 5,891,552 A * 4/1999 Lu et al. 428/195 --.
OTHER PUBLICATIONS,
"Patent Abstracts of Japan vol. 1999" reference, after "Kogyosho" insert -- : --.
"Database WPI" reference, after "GB;" insert -- Class A97, --.

<u>Column 6,</u>
Line 1, after "claim 1", insert -- , --.

Signed and Sealed this

Third Day of January, 2006

JON W. DUDAS
*Director of the United States Patent and Trademark Office*